Nov. 18, 1969          H. O. HENZE          3,478,979
FISHING REEL
Filed July 29, 1966          3 Sheets-Sheet 1
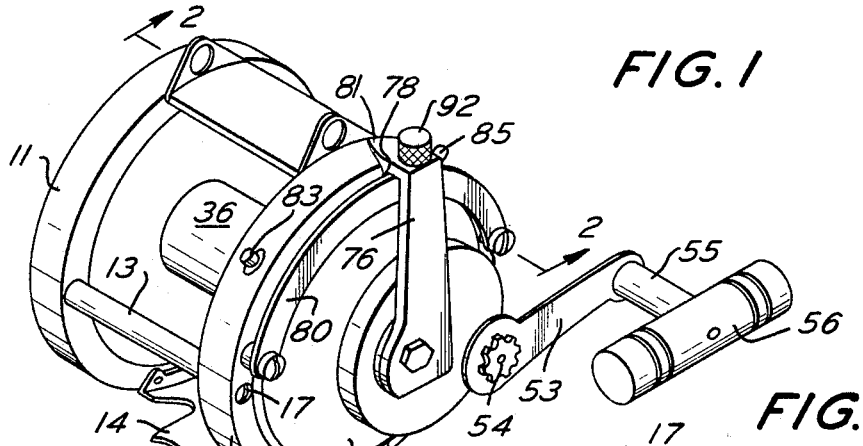
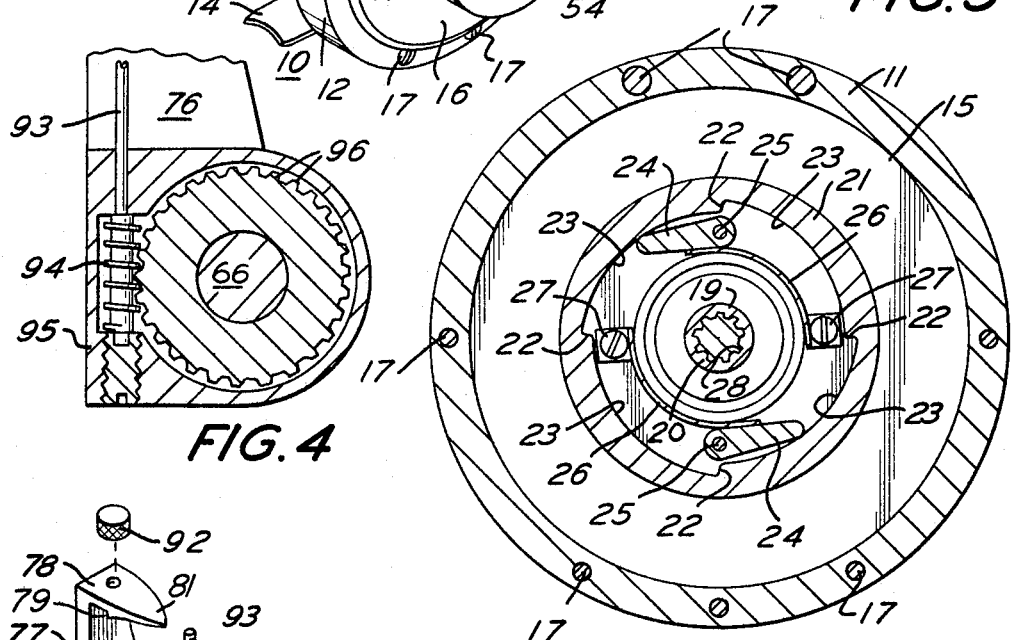
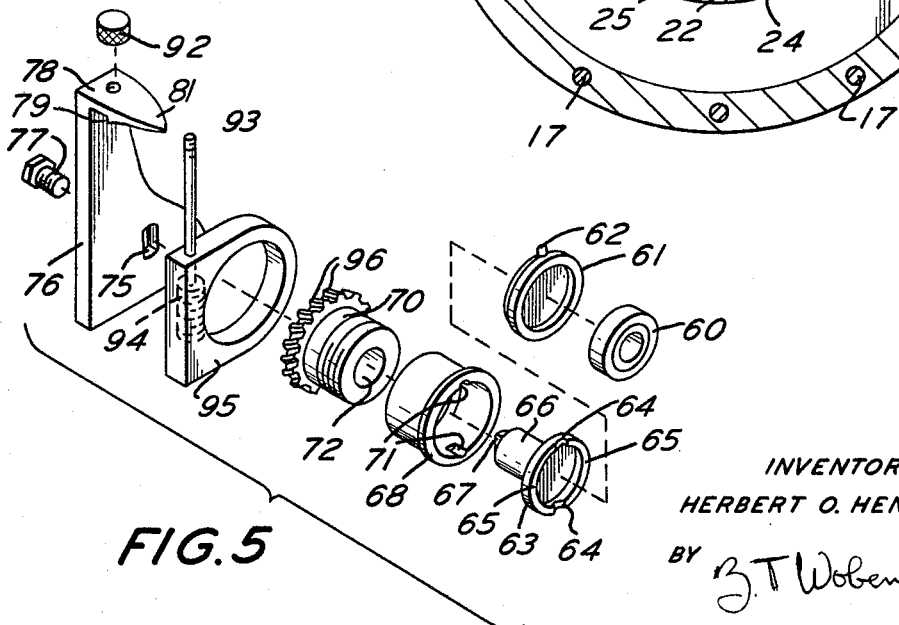
INVENTOR
HERBERT O. HENZE
BY B.T Wobensmith 2nd
ATTORNEY

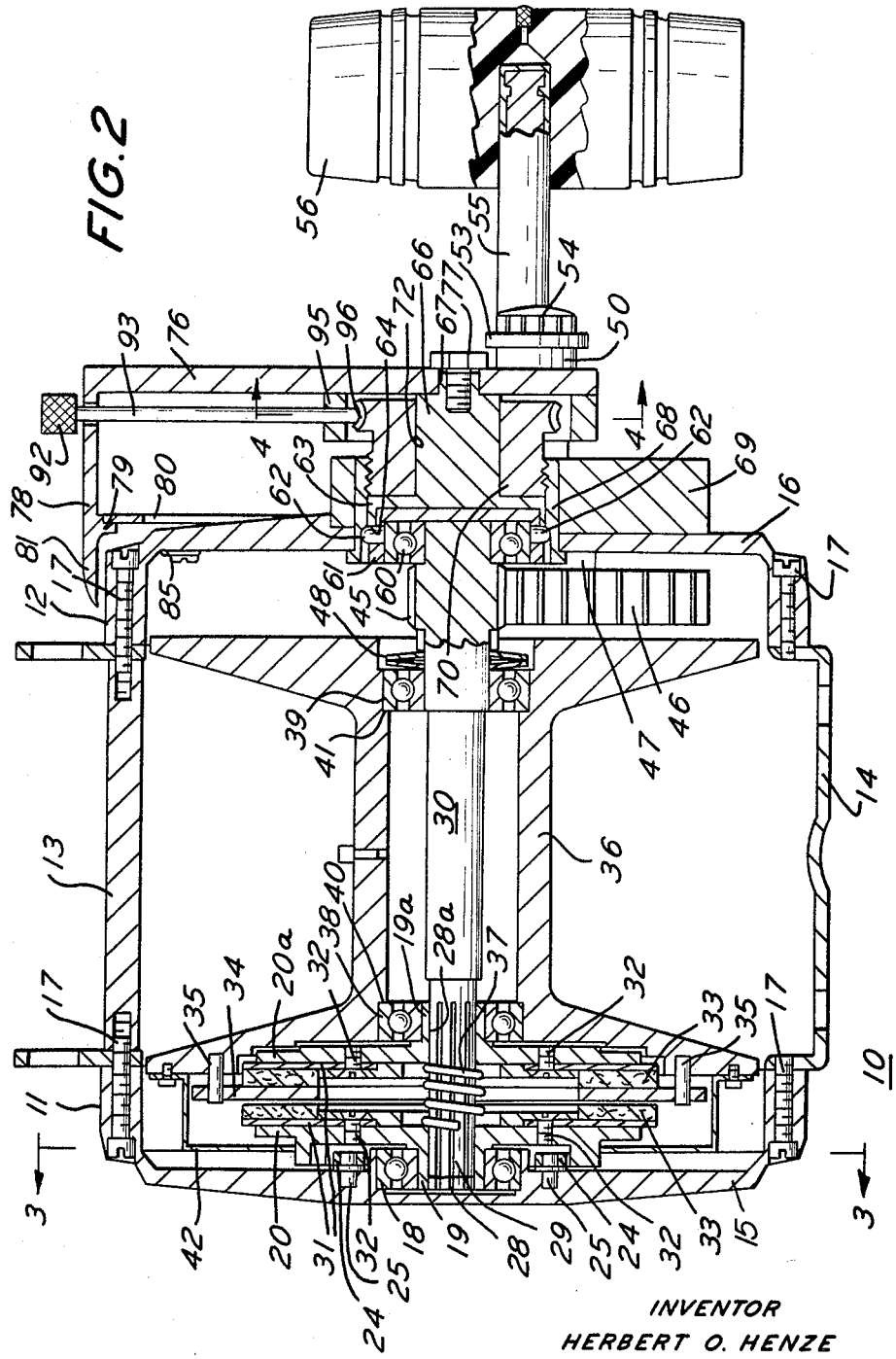

Nov. 18, 1969  H. O. HENZE  3,478,979
FISHING REEL
Filed July 29, 1966  3 Sheets-Sheet 3

INVENTOR
HERBERT O. HENZE

BY *J. T. Wobensmith 2nd*
ATTORNEY

United States Patent Office 3,478,979
Patented Nov. 18, 1969

3,478,979
FISHING REEL
Herbert O. Henze, Philadelphia, Pa., assignor to Penn Fishing Tackle Mfg. Co., Philadelphia, Pa., a corporation of Pennsylvania
Filed July 29, 1966, Ser. No. 568,784
Int. Cl. A01k 89/02
U.S. Cl. 242—84.54      6 Claims

ABSTRACT OF THE DISCLOSURE

A fishing reel having positive lever control of brake application with a location for free spool operation and an indicated range for brake control, the spool slidably carrying a brake plate. Drive plates with braking portions are disposed at opposite sides of the brake plate at one end of the shaft, the braking action being controlled by a lever at the other end of the shaft which through interposed operating connections shifts the shaft and the spool thereon longitudinally axially. An electric motor may be employed to drive the shaft.

---

This invention relates to fishing reels.

It is important in the use of fishing reels that adequate provisions be made for free spooling, for playing out the line, for controlled braking for slowing and stopping the spool as desired, and for rewinding. It has heretofore been proposed to employ a manually rotatable or star wheel for controlling the brake setting.

It is the principal object of the present invention to provide a fishing reel having a positive control of brake application with a predetermined location for free spool action and a predetermined and indicated range for brake control together with increased available braking surface.

It is a further object of the present invention to provide a fishing reel with a manually accessible brake control lever movable to a positive location for free spooling and in a predetermined range for brake control together with provisions for optional manual and motor operation of the spool.

It is a further object of the present invention to provide a fishing reel of the character aforesaid which is rugged and free from operating difficulties.

Other objects and advantageous features of the invention will be apparent from the description and claims.

The nature and characteristic features of the invention will be more readily understood from the following description taken in connection with the accompanying drawings forming part thereof, in which:

FIGURE 1 is a view in perspective of a fishing reel in accordance with the invention;

FIG. 2 is a longitudinal sectional view, enlarged, taken approximately on the line 2—2 of FIG. 1;

FIG. 3 is a transverse sectional view, on a smaller scale, taken approximately on the line 3—3 of FIG. 2;

FIG. 4 is a vertical sectional view, enlarged, taken approximately on the line 4—4 of FIG. 2;

FIG. 5 is an exploded perspective view of a portion of the control structure shown in FIG. 2;

Figure 6:
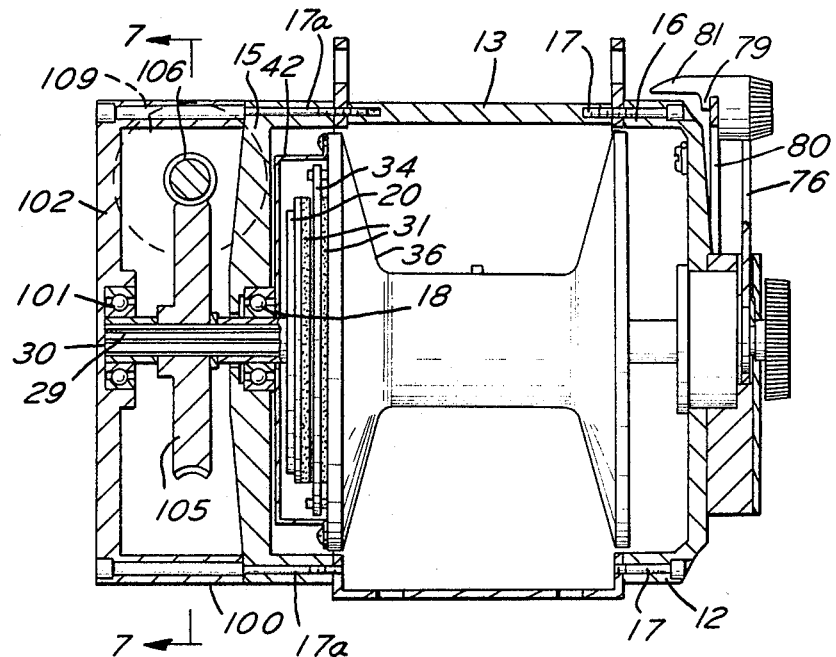
FIG. 6 is a view of a fishing reel in accordance with the invention and having a motor and a manual drive for the spool.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 to 5 of the drawing a reel frame is shown at 10 having side rings 11 and 12 connected by frame posts 13, and with a reel stand 14 carried thereby. The side rings 11 and 12 have side plates 15 and 16 integral therewith. The side plates 15 and 16 are held in assembled relation to the frame posts 13 and reel stand 14 by screws 17.

The side plate 15 has a bearing 18 carried thereby which supports the hub 19 of an outer drive plate 20. The drive plate 20, on the same side thereof as the hub 19 has a side rim 21 provided with a plurality of interior peripheral shoulders 22 with guide surfaces 23 therebetween (see FIG. 3).

The side plate 15 on the interior thereof has a plurality of dogs 24 carried on pivot pins 25, and normally urged outwardly by springs 26 which extend around the outside of the bearing 18 and are clamped in place by screws 27.

The drive plate 20 has interior splines 28 for slidable engagement by complemental splines 29 of a shaft 30.

An inner drive plate 20a is provided having a hub 19a with interior splines 28a for slidable engagement on the splines 29.

Each of the drive plates 20 and 20a has a drag washer 31 secured thereto by screws 32 and each washer 31 carries a friction ring 33. Interposed between the friction rings 33 a brake disc 34 is provided slidably carried by mounting pins 35 which are secured in a spool 36.

Interposed between the outer and inner drive plates 20 and 20a, and carried on the spline portion 29, a compression spring 37 is mounted which normally urges the plates 20 and 20a apart. The shaft 30 has, at spaced locations thereon, spool supporting bearings 38 and 39 which engage internal shoulders 40 and 41 of the spool 36.

A drag cover ring 42 can be provided carried by the spool 36.

The shaft 30 has an integral pinion 45 with which a gear 46 on a drive shaft 47 is in engagement. A relatively stiff spring 48, such as a Belleville spring washer, is interposed between the pinion 45 and the inner race of the bearing 39.

The drive shaft 47 is connected by suitable gearing (not shown) to a shaft (not shown) within a sleeve 50, a radial handle lever 53 being secured to the shaft by a stud 54 and which carries an operating rod 55 on which a manually operable knob 56 is pivotally supported.

The longitudinal axial position of the shaft 30 and accordingly of the spool 36 is controlled by the structure to be described and which is shown in detail in FIGS. 4 and 5. The end of the shaft 30, outwardly beyond the pinion 45, is carried in a bearing 60.

The bearing 60 is seated within a cup shaped bearing carrier 61 which has radial pins 62. A bearing positioning head 63 is provided having opposite notches 64 in which the pins 62 can be seated in free spool position and cam faces 65 extending therefrom for braking. The head 63 has an adjusting shaft 66 for coarse adjustment extending therefrom, with an end portion 67. The head 63, carrier 61 and bearing 60 are mounted within a cam housing having a shoulder sleeve 68 engaged with the side plate 16. The sleeve 68 is supported in a frame block 69 carried by the side plate 16 and has an adjusting plug 70 in threaded engagement therewith. The sleeve 68 has interior slots 71 to permit sliding movement of the pins 62.

The adjusting plug 70 has a central opening 72 for the reception of the shaft 66 and an end bearing face 73 for engagement with the head 63.

The end portion 67 of the shaft 66 is received in a complemental opening 75 in a brake control lever 76.

The lever 76 is held in position on the end portion 67 by a stud 77.

The brake control lever 76 has a guide head 78 and a stop finger portion 81 and also has a rib portion 79 engaged with an arcuate guide strip 80 which is carried on the side plate 16.

The side plate 16 has a radially disposed resiliently outwardly urged free spool stop pin 83 mounted therein and, circumferentially spaced with respect thereto, a radially disposed resiliently outwardly urged brake or strike stop pin 85 mounted thereon.

The pins 83 and 85 are normally in the path of movement of the stop finger 81 but may be manually moved inwardly to permit the finger 81 to pass.

In order to determine the initial or presetting of the longitudinal axial position of the shaft 30 an adjusting knob 92 is provided on a shaft 93 which extends through the stop finger 81 and which has secured thereto a worm gear 94 in a housing 95. The adjusting plug 70 has teeth 96 with which the worm gear 94 engage.

The mode of operation will now be pointed out.

For free spooling, the brake control lever 76 is positioned at the free spool position, i.e. engaging the head of the stop pin 83 and urging it inwardly. In this position the cam follower pins 62 will be seated in the notches 64 and the drag washer 31 will be held apart by the action of the springs 37 and 48. No braking action will be applied under this condition. The radial handle 53 can be turned manually in a clockwise direction but is restrained from movement in a counter clockwise direction by the engagement of the dogs 24 against the shoulders 22.

If now, it is desired to apply a braking action to reduce the freedom of payout of line from the spool 36, the stop finger portion 81 is positioned at the desired location between the stop pins 83 and 85. Greater braking force is applied by closer positioning of the guide head 78 to the stop pin 85. The braking action is accomplished by engagement of the cam faces 65 with the pins 62 to urge the bearing carrier 61, and the bearing 60 therein toward the left as seen in FIG. 2 to move the shaft 30 against the force of the spring 37, and thereby move the spool 36 toward the left to engage the drag washer 31 on the inner drive plate 20a at the left side of the spool with the brake disc 34 and the brake disc 34 with the drag washer 31 on the outer drive plate 20 and this in turn against the abutment provided by the bearing 18 and the side plate 15.

The outer drive plate 20 is held against rotation in the braking direction by engagement of the dogs 24 with the shoulders 22. The extent of braking action will be determined by the positioning of the lever 76, a wider range of control and more effective braking being available by the use of the slidable brake disc 34.

Preset of the desired braking action can be effected by rotation of the present knob 92 which operating through the reducing gears 94 and 95 causes axial movement of the threaded adjusting plug 70 thereby advancing or returning positioning head 63 and bearing 60 contained in bearing carrier 61.

With the guide head 78 positioned to engage the pin 85 and force it inwardly a full brake application will be effected and maintained. Additional braking or complete locking action can be effected by depressing the pin 85 and moving the guide head 78 thereover.

In the brake applied position of the brake control lever 76 the radial handle 53 can be turned in a clockwise direction as seen in FIG. 1 to wind the line onto the spool 36.

A quick and positive control of the spool operation is thus provided with the spool 36 free and maintained free when desired, and with preset and variable brake application controlled by the brake control lever 76 as positioned by movement of the guide head 78.

Figure 7:
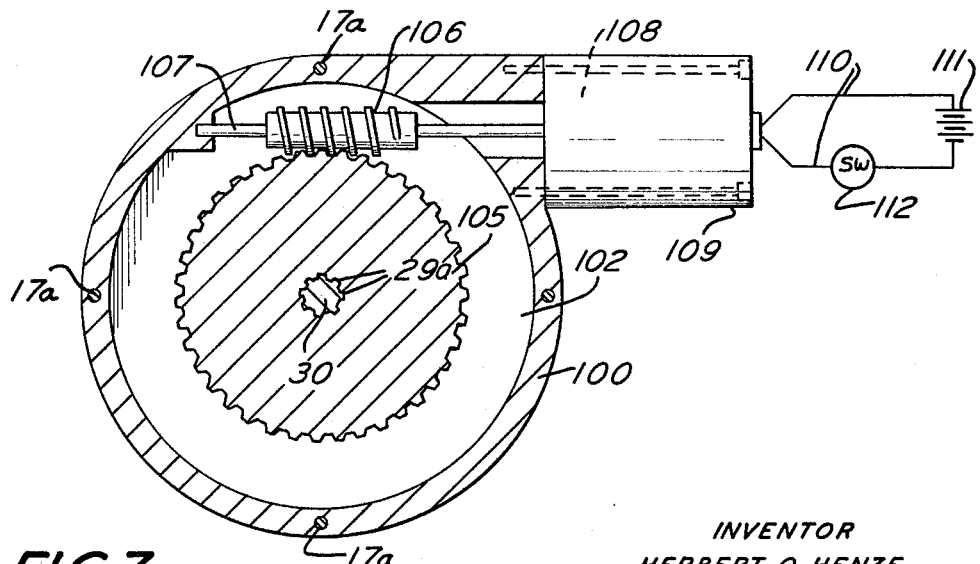
FIG. 7 is a vertical sectional view taken approximately on the line 7—7 of FIG. 6.

Referring now more particularly to FIGS. 6 and 7 of the drawings the fishing reel there shown in similar in most respects to the fishing reel previously described.

The manually operable handle with the knob are omitted and the dogs and their shoulders are also unnecessary. The spool 36 is carried on a shaft 30a as before but the shaft 30a is extended through the left side plate 15, its splines 29a also being extended.

The braking system is preferably the same as that previously described with a horizontally slidable disc plate 34, outer and inner drive plates 20 and 20a and outer and inner friction rings 33 for engagement by and with the brake disc 34.

The brake control and adjustment can be with structure previously described and including brake control lever 76a.

A motor drive housing 100 is provided and may be secured in position exteriorly with respect to the side plate 15 by screws 17a. An outer bearing 101 is preferably provided in an end wall 102 of the housing 100 and spaced between the bearings 18 and 101 by sleeves 103 and 104, an internally splined drive gear 105 is provided. The gear 105 has a worm gear 106, secured to a shaft 107 engaged therewith. The shaft 107 can be supported in the housing 100 and has an electric motor 108 connected thereto mounted in a motor housing 109 which extends from the housing 100. Conductors 110 are connected to a suitable source 111 of electrical energy, a switch 112 being provided to determine the energization of the motor 108.

The mode of operation of the fishing reel shown in FIGS. 6 and 7 is the same as that previously described except that the motor 108 is used in place of manual operation of the spool 36 for winding of the line.

It will thus be seen that structure has been provided for carrying out the objects of the invention.

I claim:
1. A fishing reel comprising
   a frame having side plates,
   a spool,
   a shaft having a portion journaled in one of said side plates and on which said spool is journaled,
   braking means interposed between said side plate and the contiguous end of the spool for free spool operation and for braking,
   means for longitudinally axially positioning said spool for said free spool operation and for braking,
   said means including a brake control lever movably mounted with respect to the other of said side plates, and
   operating connections between said brake control lever and said shaft and aligned with said shaft for determining the longitudinal axial positioning of said spool and the operation of said braking means,
   said operating connections including opposed cam members for effecting relatively large longitudinal axial movement of said spool upon movement of said lever,
   said braking means including spaced outer and inner braking members in said frame one of which is contiguous to said one of said side plates and the other of which is longitudinally axially movable with respect to the shaft and rotatable with respect to said spool,
   said braking means also including a brake plate interposed between said braking members for engagement thereby, and
   means holding said brake plate against rotation relative to said spool.
2. A fishing reel as defined in claim 1 having
   additional manually operable members connected to said operating mechanism for effecting a relatively smaller longitudinal axial movement of said spool.
3. A fishing reel as defined in claim 1 in which
   a resilient member is interposed between said braking members normally urging said members apart.

4. A fishing reel as defined in claim 1 in which said brake plate is slidably mounted longitudinally of said shaft and is held against rotation by members engaging said brake plate and said spool.

5. A fishing reel as defined in claim 1 in which said outer braking member has members interposed between it and said one of said side plates for preventing rotation of said braking member in one direction.

6. A fishing reel as defined in claim 1 in which said operating connections include a member for imparting a longitudinal axial force from said spool to the inner braking member and therefrom through said brake plate to said outer braking member and to said one of said side plates.

References Cited

UNITED STATES PATENTS

| | | | |
|---|---|---|---|
| 1,551,072 | 8/1925 | Stine | 254—187 |
| 2,417,732 | 3/1947 | Bland et al. | 242—84.46 |
| 2,760,736 | 8/1956 | Mihalko et al. | 242—84.5 |
| 2,866,291 | 12/1958 | Duell | 43—21 |
| 3,017,135 | 1/1962 | Wood | 242—84.54 |
| 3,146,966 | 9/1964 | Dunn | 242—84.45 |

BILLY S. TAYLOR, Primary Examiner

U.S. Cl. X.R.

242—84.1; 192—12, 93